Figure 1:
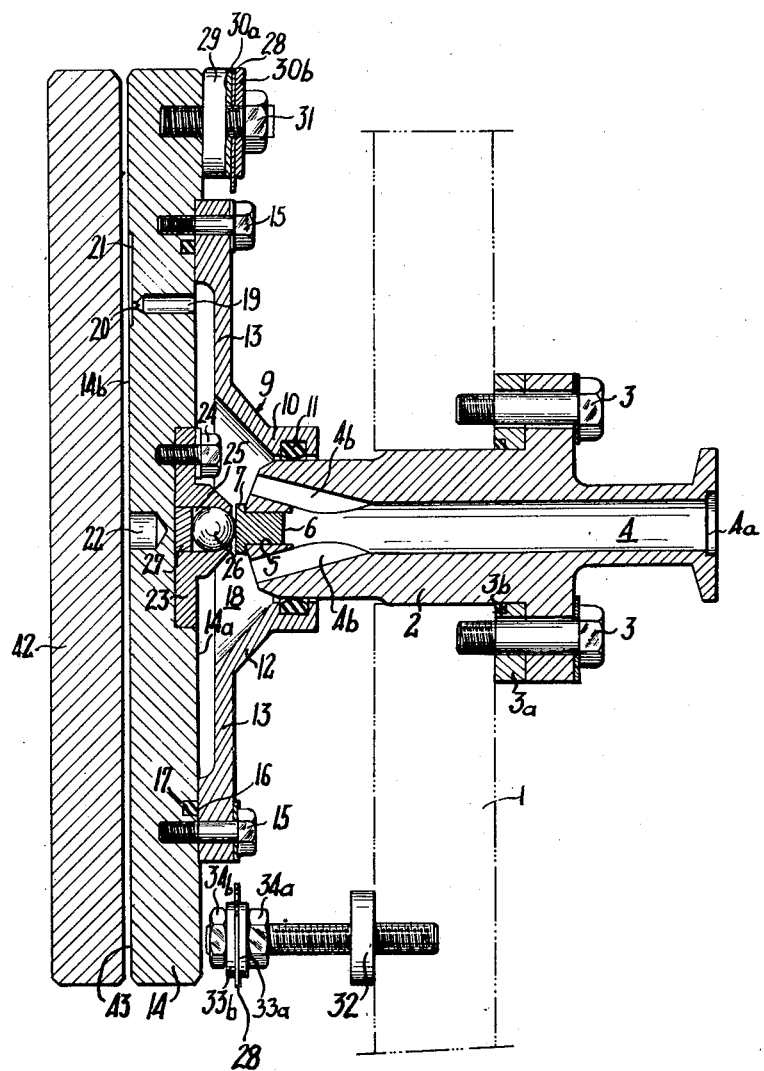

United States Patent Office 3,152,845
Patented Oct. 13, 1964

3,152,845
AIR BEARING
André Ertaud, Paris, Jean Friberg, Bourg-la-Reine, and Pierre Maginot, Paris, France, assignors to Commissariat a l'Energie Atomique, Paris, France
Filed May 23, 1962, Ser. No. 196,980
Claims priority, application France, June 6, 1961, 864,024
9 Claims. (Cl. 308—9)

The present invention relates to air bearings for rotary machines. Air bearings are essentially constituted by a rotatable plate fixed to the rotor of the rotary machine and supported by one or more jets of gas issuing through vents provided in a so-called "fixed" or non-rotating plate, which is more or less directly connected to the fixed housing or a fixed member integral therewith.

A drawback with known air bearings is that in order to obtain adequate efficiency with a weak flow of gas, the gap between the non-rotating plate and the rotatable plate must be very small; since a perfect parallelism between these plates cannot be obtained owing to constructional difficulties, one of these plates being movably connected and the other being connected to the housing, the so-called fixed plate must be connected to the housing by means of a suspension which ensures:

A high degree of rigidity along the axis of the machine so as to avoid axial vibrations, and A sufficiently flexible orientation of the movable plate.

It is necessary that this suspension device and the gas-feed device ensure, as adequately as possible, a self-orientating recall torque and a small escape flow.

Another drawback to air bearings is the relatively high feed pressure necessary in proximity to the injection apertures; finally, another drawback is the fact that when in operation they are frequently the cause of axial vibrations.

It is an object of the invention to provide an air bearing comprising a suspension of the type which meets the abovementioned requirements and which, moreover, is as free as possible from the abovementioned drawbacks.

The invention consists in an air bearing comprising a rotatable plate fixed to the rotor of a rotary machine and supported by gas jets issuing through vents provided in a second plate connected to the fixed housing of the machine, comprising a freely rotatable ball, a support fixed to the center of the fixed plate, for preventing translatory movement of said ball, a plane surface integral with the housing of the machine and in contact with the ball, a flexible ring located in a plane parallel to said plane surface, means for fixing said ring to the housing and to the fixed plate at equidistant and alternate points, and means for delivering the gas.

The fixing points of the ring to the fixed plate and to the housing may be respectively separated at an angle of 90°. Each pair of fixing points may be diametrically opposed.

The injection of gas may be effected through three apertures or vents which are located at angles of 120° from one another at a distance from the center of the apparatus which is approximately equal to half the radius of the plates of the stop.

A bean-shaped chamber may be provided around each of these three apertures, these chambers acting to distribute the feed pressure over a surface which is relatively large in relation to the section of the apertures.

A central recess of relatively large volume, of a few cubic centimeters for example, may be provided in one of the two facing surfaces of either the fixed plate or the movable plate.

Figure 2:
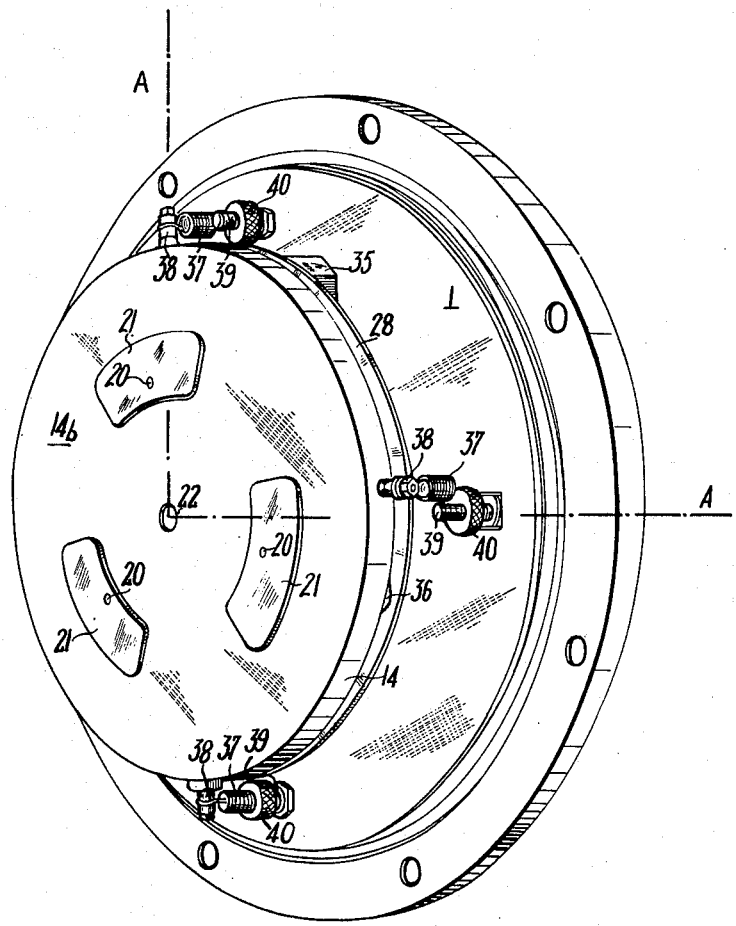

In order that the invention may be more clearly understood, reference will now be made to the accompanying drawings which show two embodiments thereof by way of example, and in which:

FIGURE 1 shows a view of a stop according to the invention, shown in section along line AA of FIGURE 2, and FIGURE 2 shows a perspective view of the so-called "fixed" part, but employing a modified embodiment of the suspension system.

In accordance with the embodiment illustrated in the drawings, a housing or other fixed support 1 has a pipe 2 passing therethrough but fixed thereto, for example by means of screws 3 with a washer 3a and a flexible sealing gasket 3b. This pipe has an internal bore 4, the end 4a of which, outside the housing, may be connected to a gas conduit and the other end of which, within the housing, is provided with channels 4b around its circumference, these channels being oblique in relation to the axis of the pipe, symmetrically distributed and opening into the bore 4. The center of the inner extremity of the pipe 2 has an aperture 5 wherein is arranged a member 6 comprising a plane surface 7 of hard steel.

A supporting member 9 is mounted on this fixed pipe, and comprises a central annular part 10 provided with a groove wherein is secured a toric joint 11 made of a flexible material; this part 10 is connected to an intermediate conical part 12 which is connected to a ring-shaped outer part 13.

A plate 14, which may be referred to as a "fixed plate," although it is assembled in such a way that it may oscillate to a certain extent in relation to the fixed housing 1, as will be disclosed further on in the description of the suspension system, is secured to the ring 13, by means of screws 15, spaced at regular intervals around the circumference; a ring 16 made from rubber or a similar flexible material and arranged in a circular groove 17 of the plate ensures a hermetic seal between these two members. If desired, the groove may be provided in the ring 13, as will be apparent.

The space 18 defined by the inner surface 14a of the plate 14, the member 9 and the extremity of the pipe 2, is connected to the outer surface 14b of the same plate 14 by three injection apertures 19 (FIGURE 1), these being spaced at regular angles around the axis of the apparatus and arranged in the approximate center of the corresponding radii of the plate. The apertures open out, through small-section orifices 20, into bean-shaped chambers 21 (FIGURE 2) which are shallow, e.g. only about a few millimeters deep.

A recess 22 having a relatively large volume, of a few cubic centimeters for example, is provided in the center of surface 14b of the plate 14.

To the central portion of the inner surface 14a of the plate 14, there is secured by screws 24, a member 23 which has an open cylindrical cavity 25 acting as ball-race for one ball 26 resting on a hard steel seat 27. This ball also rests on the surface 7 of the member 6 whereon it may rotate, this member 6 being, as already referred to, fixed in relation to the pipe 2 and, consequently, to the housing. The plate 14 is, moreover, connected to the housing by means of a flexible ring 28 arranged in the plane of surface 7. This ring is fixed to the plate 14 by two diametrically opposed bolts 29, screwed into the plate 14, each of these bolts being provided with two washers 30a, 30b, which hold the flexible ring 28 between them, and is also provided with a tightening nut 31.

Moreover, the flexible ring 28 is fixed to the fixed housing by two other diametrically opposed bolts 32 located at 90° in relation to the bolts 29, each of the bolts 32 being provided with washers 33a, 33b, which hold the flexible ring 28 between them, and two tightening nuts 34a, 34b.

The suspension device for the non-rotating plate, shown in FIGURE 2, differs slightly from that shown in FIGURE 1. In this modification, the flexible ring 28 is separated from the housing by two stop-struts 35 and from the non-rotating plate 14 by two stop-struts 36. Furthermore, the plate 14 is drawn towards the housing by four springs 37; each of these springs is connected at one of its ends to a bolt 38 fixed to the plate and by its other end to a bolt 39 secured to the housing and provided with a milled nut 40, by means of which the spring tension may be regulated.

In the two embodiments, the air bearing is completed by a movable plate 42 (FIGURE 1) integral with the rotatable member of the machine, a very slight gap 43 being provided between the plates 14 and 42. In FIGURE 2, the movable plate is not shown in order that the surface 14b of the plate 14 may be left exposed.

It will be seen that the flexible ring 28 constitutes a genuine Cardan suspension; the non-rotating plate having, in reality, two degrees of liberty of limited amplitude, thus allowing the shaft to be centered; moreover, this suspension device has the advantage of comprising no pivots; finally, the ball 26 constitutes a swivel-joint which rotates without slipping on surface 7 and which is subjected to practically no wear.

The arrangement of the three vents 20 ensures a good compromise between the self-orientating recall torque and the escape flow.

The feed pressure required in proximity to the injection orifices 20 is greatly reduced by the presence of the bean-shaped chambers 21, which act to distribute the feed pressure over an area which is bigger than the section of the orifices.

Finally, the axial vibrations are virtually overcome by the presence of the recess 22.

The invention thus enables an air bearing to be constructed which has an axial position which is fixed and well defined by the spherical ball 26, which is self-orientating as a result of the Cardan suspension and; finally the stop is practically free from the aforementioned drawbacks.

The invention is not limited to the embodiments described and illustrated which have been given solely by way of example.

This stop may be used with a horizontally rotatable shaft or with a vertically rotatable shaft.

What we claim is:

1. An air bearing comprising a rotatable plate fixed to the rotor of a rotary machine and supported by gas jets issuing through vents provided in a second plate connected to the fixed housing of the machine, comprising a freely rotatable ball, a support for said ball fixed to the center of the second plate for preventing translatory movement of said ball, a plane surface mounted on the housing of the machine and in contact with the ball, a flexible ring located in a plane parallel to said plane surface, means for fixing said ring to the housing and to the second plate at equidistant and alternate points, and means for delivering the gas to said vents.

2. A bearing as claimed in claim 1, comprising a gas feed pipe which is rigidly fixed to the housing, and means for mounting the plane surface on the end of said pipe and coaxial thereto.

3. A bearing as claimed in claim 2, comprising a recess having a relatively large volume and provided in one of the surfaces upon which the gas jets act.

4. A bearing as claimed in claim 1, comprising two groups of diametrically opposed members for fixing the flexible ring to the second plate and two other groups of members which are also diametrically opposed, for fixing the said ring to the housing.

5. A bearing as claimed in claim 4, comprising nut and bolt systems for fixing the flexible ring to the housing and to the second plate.

6. A bearing as claimed in claim 4, comprising stop-struts between the ring and the housing and between the ring and the second plate, and connecting springs between the second plate and the housing.

7. A bearing as claimed in claim 1, wherein the gas is injected through three vents located at angles of 120° from one another and at a distance from the center of the apparatus which is equal to approximately half the radius of the stop plates.

8. A bearing as claimed in claim 7, a chamber is provided around said apertures, which acts to distribute the feed pressure over an area which is relatively large in relation to the section of the apertures.

9. A bearing as claimed in claim 8, wherein said chambers are bean-shaped.

References Cited in the file of this patent
UNITED STATES PATENTS 2,597,371    Perkins  ---------------- May 20, 1952
2,937,240    Harker  ----------------- May 17, 1960